(12) United States Patent
Pluchon

(10) Patent No.: US 12,729,752 B2
(45) Date of Patent: Sep. 8, 2026

(54) BALL SCREW ASSEMBLIES

(71) Applicant: Ratier-Figeac SAS, Figeac (FR)

(72) Inventor: Etienne Pluchon, Montfaucon (FR)

(73) Assignee: RATIER-FIGEAC SAS, Figeac (FR)

( * ) Notice: Subject to any disclaimer, the term of this patent is extended or adjusted under 35 U.S.C. 154(b) by 0 days.

(21) Appl. No.: 19/248,781

(22) Filed: Jun. 25, 2025

(65) Prior Publication Data

US 2025/0389320 A1 Dec. 25, 2025

(30) Foreign Application Priority Data

Jun. 25, 2024 (EP) .................................... 24184484

(51) Int. Cl.
*F16H 25/22* (2006.01)
*F16H 25/24* (2006.01)
*F16H 57/04* (2010.01)

(52) U.S. Cl.
CPC ..... *F16H 25/2214* (2013.01); *F16H 25/2418* (2013.01); *F16H 57/0445* (2013.01); *F16H 57/0453* (2013.01)

(58) Field of Classification Search
CPC ............. F16H 57/0497; F16H 25/2418; F16H 25/2214
USPC ...................................................... 74/424.83
See application file for complete search history.

(56) References Cited

U.S. PATENT DOCUMENTS 5,832,944 A * 11/1998 Lindner .................. F01D 17/26 251/30.02
8,746,409 B2 6/2014 Chiang et al.
8,931,358 B2 * 1/2015 Chang ................. F16H 25/2214 74/89.3
9,133,921 B2 9/2015 Shindo et al.
12,460,714 B2 * 11/2025 Tamura ................... F16D 65/14
2017/0002680 A1 * 1/2017 Tonaka ................... F01D 25/24
2019/0101208 A1 4/2019 Morgan et al.
2021/0131552 A1 5/2021 Houdard et al.

FOREIGN PATENT DOCUMENTS

CN 213298723 U 5/2021
EP 3318781 B1 9/2020
JP 2003120783 A 4/2003

(Continued)

OTHER PUBLICATIONS

European Search Report for Application No. 24184484.4, mailed Dec. 16, 2024, 12 pages.

*Primary Examiner* — Jake Cook
(74) *Attorney, Agent, or Firm* — CANTOR COLBURN LLP

(57) ABSTRACT

A ball screw comprising a screw shaft, a ball nut, and alpha and beta load circuits. The alpha and beta load circuits each include first and second parts. The screw shaft is longitudinally extending with a longitudinal central axis (A) and at least part of the longitudinally extending surface of the screw shaft comprises an external thread, and at least one of the first parts of the alpha and beta load circuits comprise a part of the external thread. The ball nut comprises a body, a bore, the second parts of the alpha and beta load circuits, and an alpha and a beta lubricant channel. The bore is defined by the body, is longitudinally extending with a longitudinal central axis (A), has a first and second end, and has at least one longitudinally extending surface extending between the first and second ends.

15 Claims, 4 Drawing Sheets

(56) References Cited

FOREIGN PATENT DOCUMENTS

| | | |
|---|---|---|
| JP | 2008002566 A | 1/2008 |
| JP | 2009197861 A | 9/2009 |

* cited by examiner

BALL SCREW ASSEMBLIES

CROSS-REFERENCE TO RELATED APPLICATIONS

This application claims the benefit of European Patent Application No. 24184484.4 filed Jun. 25, 2024, the disclosure of which is incorporated herein by reference in its entirety.

TECHNICAL FIELD

This disclosure relates to ball screw assemblies, and in particular to the lubrication of ball screw assemblies.

BACKGROUND

Ball screw assemblies typically comprise a screw shaft and a ball nut. One of the screw shaft and the ball nut rotates relative to the other and the relative longitudinal position of the ball nut on the screw shaft changes as a result of that relative rotation. The relative rotational motion is converted to relative longitudinal motion or relative longitudinal motion is converted to relative rotational motion via a plurality of ball bearings that interact with both the screw shaft and the ball nut. Hereafter, reference to "ball" or "balls" is a reference to ball bearings.

The screw shaft is typically cylindrical, longitudinally extending with a central axis and a lateral surface. Typically the lateral surface comprises one or more external threads. Each external tread is so configured that it provides an open channel or raceway along which ball bearings may travel.

A channel or raceway is open if it does not surround ball bearings passing along the channel. A channel or raceway is closed if it substantially or wholly surrounds ball bearings passing along the channel.

The ball nut typically comprises a body with a cylindrical bore extending through the body. The bore comprises one or more internal or inside threads, and one or more ball return or recirculation systems. Each internal tread is so configured that each internal thread provides an open channel or raceway along which ball bearings may travel.

The external and internal threads of the screw shaft and ball nut are so configured that when the screw shaft extends through the bore the external and internal threads can, together, define one or more closed channels or raceways along which ball bearings may travel.

The ball return system typically comprises a ball return channel that extends through, or partially through and partially externally to the body of the ball nut between a first axial position and a second axial locations on the closed channel or raceway. The ball return channel allows ball bearings to travel between the first and second axial locations on the closed channel or raceway along the ball return channel.

When the rotation of the screw shaft relative to the ball nut is in a first direction, ball bearings travel along the closed channel or raceway from the first end of the ball return channel/first axial location on the closed channel or raceway to the second axial location on the closed channel or raceway/second end of the ball return channel. The ball bearings then enter the ball return channel through the second end and travel along the ball return channel until they reach the first end of the ball return channel. The ball bearings then exit the second end of the ball return channel into the closed raceway. The ball bearings repeat that circuit for as long as the relative rotation of the screw shaft and ball nut continues. The circuit travelled by the ball bearings may be referred to as a return circuit or a load circuit. Relative rotation of the screw shaft and ball nut in the opposite direction causes the ball bearings to travel around the load circuit in the opposite direction.

Typically the ball nut further comprises a ball nut seal or wiper located at or adjacent each end of the bore/internal thread. Each ball nut seal is retained by the ball nut and stays in a fixed position relative to the ball nut. The ball nut seal has one or more internal threads which closely mate with the or each external thread. Each ball nut seal forms a seal between the ball nut and the screw shaft that is substantially lubricant tight, wholly lubricant tight, or allows up to a predetermined maximum flow rate of lubricant to exit from the ball screw.

To lubricate the ball screw assembly, and to reduce friction and wear in the assembly, lubricant such as oil or grease is typically introduced into one or more of the closed channel or raceway and ball return channel through an oil or grease hole.

SUMMARY

According to the present disclosure there is provided an improved ball screw. The improved ball screw is configured to allow for improved lubrication of the ball screw. The improved ball screw also allows increased intervals between servicing and/or refilling the ball screw with lubricant.

According to a first aspect of the present disclosure there is provided a ball screw comprising a screw shaft, a ball nut, and alpha and beta load circuits, in which the alpha and beta load circuits each comprise first and second parts. The screw shaft is longitudinally extending with a longitudinal central axis and at least part of the longitudinally extending surface of the screw shaft comprises an external thread. At least one of the first parts of the alpha and beta load circuits comprise at least a part of the external thread. The ball nut comprises a body, a bore, the second parts of the alpha and beta load circuits, and an alpha and a beta lubricant channel. The bore is defined by the body, and is longitudinally extending with a longitudinal central axis. The bore has a first and second end, and has at least one longitudinally extending surface extending between the first and second ends. The first and second ends of the bore each comprise a mouth, and each mouth opens through an outside surface of the body. The longitudinally extending surface of the bore comprises at least one internal thread, and the second parts of the alpha and beta load circuits comprise at least a part of an internal thread. The screw shaft extends through the bore of the ball nut and is co-axial with the bore. The external thread of the screw shaft and each internal tread of the ball nut are so configured that the external thread and at least one of the internal threads together define at least one of a portion of the alpha load circuit and a portion of the beta load circuit. The alpha load circuit is spaced from the first end of the bore and extends for an axial distance along the bore, the beta load circuit is spaced from the second end of the bore and extends for an axial distance along the bore, and the alpha and beta load circuits are spaced from each other. The alpha lubricant channel comprises a first and a second channel end and a flow path between the first and second channel ends in which the first channel end is located between the first end of the bore and the second part of the alpha load circuit, and the second channel end is located between the second part of the alpha load circuit and the second part of the beta load circuit. The beta lubricant channel comprises a first and a second channel end and a flow path between the first and second channel ends in which the first channel end is located between the second end of the bore and the second part of the beta load circuit, the second channel end is located between the second part of the alpha load circuit and the second part of the beta load circuit. Rotation of one of the screw shaft and the ball nut relative to the other around the longitudinal axis causes axial movement of the ball nut relative to the screw shaft, the ball screw further comprises a shuttle, in which the shuttle is engaged with the longitudinally extending surface of the screw shaft, the shuttle is located between the first parts of the alpha and beta load circuits, and the shuttle is in sliding contact with the ball nut, and rotation of one of the screw shaft and the ball nut relative to the other around the longitudinal axis drives lubricant through one of the alpha and beta lubricant channels.

The alpha and beta lubricant channels are spaced from each other in an axial direction, in a thread-wise (along the path described by the thread) direction, or in an axial and thread-wise direction.

It is to be understood that all references to a longitudinal axis, longitudinal central axis, longitudinal direction, use of axial or like terminology, and use of radial and circumferential all reference the common central axis of the screw shaft and bore when the screw shaft extends through the bore unless specifically stated otherwise.

In an embodiment of the above embodiment the ball screw further comprises a plurality of ball bearings. Each of the alpha and beta load circuits comprise a plurality of those ball bearings.

In an embodiment of any of the above embodiments the external thread is a helical thread. In some embodiments the external thread is formed so as to create a groove, channel or raceway that is so configured that the ball bearings can roll along the groove between adjacent thread crests. In some embodiments the cross section of the groove is approximately semi-circular. In other embodiments, other known thread profiles may be used and such other thread profiles fall within the scope of the present disclosure.

In an embodiment of any of the above embodiments the or each internal thread is a helical thread with the same pitch as the external thread. The radially inner diameter of the internal thread (the distance between the crests of the internal thread) and the radially outer diameter of the external thread (the distance between the crests of the external thread), are approximately the same. In some embodiments the internal thread is configured so as to create a groove, channel or raceway that is dimensioned so that the ball bearings can roll along the groove between adjacent crests. In some embodiments the cross section of the groove is approximately semi-circular. In other embodiments, other known thread profiles may be used and such other thread profiles fall within the scope of the present disclosure.

In an embodiment of any of the above embodiments the alpha and beta load circuits comprise at least a part of a closed channel or raceway formed by the external thread and an internal thread, and a bearing return channel.

In some embodiments the ball return channel can be wholly defined by the body of the ball nut. In other embodiments at least part of the return channel can be external to the body of the ball nut, or partially defined by the body of the ball nut and partially external to the ball nut.

The closed channel or raceway formed by the external thread and an internal thread is formed and maintained by the ball bearings in the alpha and beta load circuits holding the external and internal threads in register with each other. Alternatively expressed, the open channel or raceway formed by the external and internal threads face each other to form the closed channel or raceway. They do not stop facing each other because the ball bearings prevent the threads from not facing each other. Because the open channel or raceway cannot not face each other, rotation of one of the screw shaft and the ball nut relative to the other about their common longitudinal axis causes one of the screw shaft and ball nut to rotate and move axially relative to the other as the ball bearings travel along the closed channel or raceway formed between the external thread and an internal thread.

In an embodiment of any of the above embodiments each ball return channel has first and second ends that open into the closed channel or raceway formed by the external thread and an internal thread. In some embodiments the first and second ends each include one or more deflectors that guide the ball bearings as they move between the closed channel or raceway and the ball return channel.

In order to increase the service life and efficiency of known ball screws the or each load circuit of the ball screw is/are greased or otherwise lubricated, for example by the use of oil or a similar substance. In known ball screws there are generally one or more so called dead volumes. Dead volumes are typically found between the ball bearings and in any parts/volumes of the load circuit or in volumes in lubricant communication with the load circuit, that do not have the ball bearings moving through them. Lubricant located in the dead volumes offers little lubrication to the ball screw.

The volume or capacity of the or each load circuit to hold lubricant is typically small and as a result known load circuits are found to need to be re-lubricated on a regular basis.

An aim of the present disclosure is to promote a re-circulating lubricant flow path within the ball screw of the present disclosure in order to limit/avoid dead volumes. An advantage of achieving this aim is to improve the lubrication of the ball screw.

In an embodiment of any of the above embodiments the alpha and beta lubricant channels each have a first and a second channel mouth. Extending between the first and second channel mouths is a lubricant flow path. The lubricant flow path does not include any of the closed channel or raceway formed by the external and internal threads. The lubricant flow path is, in some embodiments, a channel or conduit that is wholly defined by the body of the ball nut. In some embodiments the flow path is a channel or conduit that is partially defined by the body of the ball nut and partially by one or more pipes, tubes or conduits that are not formed from the body of the ball nut. In some embodiments the flow path is a channel or conduit that is wholly defined by one or more pipes, tubes or conduits that are not formed from the body of the ball nut.

In an embodiment of any of the above embodiments one or both of the lubricant channel ends include one or more scoops or deflectors that cause lubricant approaching the lubricant channel end to be deflected into the lubricant channel.

It has been found that the rotation of one of the screw shaft and the ball nut relative to the other about their common longitudinal axis causes the ball bearings in the load circuits to transport lubricant along at least the closed channel or raceway formed between the external thread and an internal thread. It has also been found that at least a portion of that lubricant is not carried into the ball return channel when the ball bearings enter that return channel. It has been found that lubricant is, in particular deposited in a dead volume that is, relative to the direction of travel of the ball bearings, further along the closed channel or raceway formed by the external thread and an internal thread than the mouth of the ball return channel.

In the ball screw of the present disclosure, the first and second channel mouths of the alpha and beta lubricant channels are further along the closed channel or raceway formed between the external thread and an internal thread than the ends of the alpha and beta load circuits. The lubricant is thus deposited from the ball bearings adjacent to the ends of the alpha and beta load circuits and further along the closed channel or raceway than the ball bearings travel. In the ball screw of the present disclosure, that deposition causes lubricant to be pushed into a lubricant channel through a channel end and then along the lubricant flow path until the lubricant exits the lubricant flow path at the other channel end. The lubricant is then back in the channel or raceway formed by the external thread and the ball nut. This flow of lubricant assists in lubricating the alpha and beta load circuits.

In an embodiment of any of the above embodiments the ball screw further comprises a lubricant chamber. The lubricant chamber extends into the body of the ball nut from an aperture in at least one longitudinally extending surface of the bore. The lubricant chamber has first and second chamber ends which are axially spaced from each other. The lubricant chamber is located between the second parts of the alpha and beta load circuits, the second channel ends of the alpha and beta lubricant channels open into the lubricant chamber, and the shuttle extends into the lubricant chamber.

In an embodiment of any of the above embodiments the lubricant chamber extends around part of the longitudinal surface of the bore in the circumferential direction. In such embodiments the lubricant chamber does not extend around the whole of the bore.

In an embodiment of any of the above embodiments the lubricant chamber extends wholly around the bore in a circumferential direction.

In an embodiment of any of the above embodiments the chamber ends of the lubricant chamber are at least partially connected by a circumferentially extending surface. The circumferentially extending surface has the same radial distance from the central axis across the whole of the circumferential surface.

In an embodiment of any of the above embodiments the chamber end walls of the lubricant chamber are radially extending. In an alternative embodiment the chamber end walls of the lubricant chamber are orientated in a converging fashion with the end walls becoming closer with increasing radial distance from the central axis.

In an embodiment of any of the above embodiments the lubricant chamber is a volume that has the shape of a cylinder when the screw shaft is not extending through the bore of the ball nut, and the shape of the axially extending wall of tubular or circular cross-section. Alternatively expressed, the lubricant chamber has the shape of a ring toroid when the screw shaft is extending through the bore of the ball nut. A ring toroid has the shape that is described or formed when a rectangle is rotated around an axis that is parallel to one of the edges of that rectangle and outside of that rectangle.

In an embodiment of any of the above embodiments at least one of the alpha and beta lubricant channels comprises a means to prevent flow of lubricant from the second channel end to the first channel end of that or those lubricant channels. The prevention of flow of lubricant along the lubricant flow path in one direction has an advantage in that it promotes the flow of the lubricant around a lubricant circuit rather than potentially allowing the lubricant to repeatedly move backwards and forwards along a part of what would be a lubricant circuit if the lubricant were to travel far enough in a single direction. Prevention of the flow of lubricant from the second channel end to the first channel end of the lubricant channel(s) prevents backflow of the lubricant from the second channel end to the first channel end.

In an embodiment of the above embodiment the means to prevent flow of lubricant from the second channel end to the first channel end of that or those lubricant channels is a check valve or a similar mechanical arrangement.

In an embodiment of any of the above embodiments the second channel end of the alpha lubricant channel is, in the axial direction, between the second channel end of the beta lubricant channel and the beta load circuit, and the second channel end of the beta lubricant channel is, in the axial direction, between the alpha load circuit and the second channel end of the beta lubricant channel. Such an arrangement further promotes the formation of a lubricant circuit.

In an embodiment of any of the above embodiments the ball nut further comprises a lubricant reservoir, and the reservoir and at least one of the alpha and beta lubricant channels are so configured that the flow path of lubricant from the first to the second channel end of the at least one lubricant channel includes flow of lubricant through at least part of the lubricant reservoir.

In an embodiment of any of the above embodiments the ball nut comprises the same number of lubricant reservoirs as there are lubricant channels, each lubricant reservoir is associated with a different lubricant channel, and each lubricant channel is so configured that the flow path of lubricant from the first to the second channel end of a lubricant channel includes flow of lubricant through at least part of the associated lubricant reservoir.

In an embodiment of any of the above embodiments the ball nut comprises one lubricant reservoir, the lubricant reservoir is divided into a plurality of cells, each cell is associated with a different lubricant channel, and each lubricant channel is so configured that the flow path of lubricant from the first to the second channel end of a lubricant channel includes flow of lubricant through at least part of the associated cell in the lubricant reservoir.

In an embodiment of any of the above embodiments the ball screw further comprises at least one ball nut seal, each ball nut seal extends between the body of the ball nut and the screw shaft, at least one of the ball nut seals is located at one of:

(i) the mouth at the first end of the bore,
(ii) between the first channel end of the alpha lubricant channel and the mouth at the first end of the bore,
(iii) the mouth at the second end of the bore, or
(iv) between the first channel end of the beta lubricant channel and the mouth at the second end of the bore. The ball nut seal is in sealing contact with both the screw shaft and the ball nut. The ball nut seal thus limits the distance along the channel or raceway formed between the external thread and the or each longitudinal surface of the bore that the lubricant can travel. Because a first channel end of a lubricant channel is between the ball nut seal and the alpha or beta load circuit, lubricant pushed into the space between the ball nut seal and the alpha or beta load circuit does not become dead lubricant but is instead pushed into the lubricant channel via the first channel end of the lubricant channel.

In an embodiment of the above embodiment, each ball nut seal is retained in fixed position relative to the ball nut body.

In an embodiment of any of the above embodiments the ball screw further comprises a shuttle, in which the shuttle is engaged with the longitudinally extending surface of the screw shaft, the shuttle is located between the first parts of the alpha and beta load circuits, and the shuttle is in sliding contact with the ball nut. The sliding contact between the shuttle and the ball nut is contact with a longitudinally extending face or surface of the ball nut.

In an embodiment of any of the above embodiments the shuttle is engaged with the longitudinally extending surface of the screw shaft via an internal thread that engages with the external thread on the screw shaft.

In an embodiment of any of the above embodiments the engagement between the shuttle and the screw shaft is a sliding engagement, and that engagement is such that the force required to cause the shuttle to slide relative to the screw shaft is higher than the force required to cause the shuttle to slide relative to the ball nut and cause the flow of the lubricant around a lubricant circuit.

In an embodiment of any of the above embodiments the engagement between the shuttle and the screw shaft is a sliding engagement, and that engagement is such that when the shuttle is prevented from moving relative to the ball nut, because an engagement between the shuttle and ball nut is preventing movement, the force required to cause the shuttle to slide relative to the screw shaft is low enough that the screw shaft can continue to rotate relative to the ball nut.

In an embodiment of any of the above embodiments the engagement between the shuttle and the screw shaft is a engagement between the external thread and an internal thread associated with the shuttle, and the force required to cause the shuttle to travel along the external thread of the screw shaft is higher than the force required to cause the shuttle to slide relative to the ball nut and cause the flow of the lubricant around a lubricant circuit.

In an embodiment of any of the above embodiments where the ball screw comprises a lubricant chamber the shuttle extends into the lubricant chamber through the aperture in the one or more longitudinal or axial surfaces of the bore, the shuttle is in sliding contact with the one or more other surfaces, and the shuttle divides the lubricant chamber into first and second sub-chambers.

In an embodiment of any of the above embodiments the first and second sub-chambers are of variable volume dependent on the position of the shuttle between the first and second chamber ends.

In an embodiment of any of the above embodiments where the ball screw comprises a lubricant chamber, the shuttle is so engaged with the screw shaft that when the shuttle is not in contact with the first or second chamber ends of the lubricant chamber, rotation around the central axis of one of the screw shaft and the ball nut relative to the other causes the shuttle to remain in a fixed position relative to the screw shaft and to move relative to the ball nut. This movement of the shuttle within the lubricant chamber has the result that one of the first and second sub-chambers increases in volume and the other decreases in volume. Any lubricant in the sub-chamber which is decreasing in volume will, unless the sub-chamber is full of lubricant, initially be deformed so as to conform to the changing dimensions of the sub-chamber. Once the sub-chamber which is decreasing in volume is full of lubricant, that lubricant will start to become pressurised and will be forced or pushed through the intersection of the external thread and the chamber end wall the shuttle is moving towards. That lubricant will move along the channel formed by the external thread and the or each longitudinal surface of the bore and towards one or the other of the alpha and beta load circuits depending upon which direction the shuttle is moving relative to the ball nut. The pushing of the lubricant by the shuttle has the effect of increasing the flow of lubricant through at least part of the load circuit towards which the shuttle is moving.

In an embodiment of any of the above embodiments the shuttle is so engaged with the screw shaft that rotation around the central axis of one of the screw shaft and the ball nut relative to the other causes the shuttle to remain in a fixed position relative to the ball nut and to move relative to the screw shaft when the shuttle is in interfering contact with either of the first or second chamber ends. The shuttle is in interfering contact with a chamber end wall when the contact between the shuttle and the chamber end wall is such that the shuttle is caused to stop moving relative to the ball nut.

In this embodiment, when the shuttle moves to a position in which it is in interfering contact with a chamber end wall as a result of relative rotation between the screw shaft and the ball nut in one direction, continued relative rotation in that direction will cause the shuttle to start to move in an axial direction and rotate relative to the screw shaft.

When the direction of relative rotation between the screw shaft and the ball nut changes the shuttle will move away from the chamber end of the lubricant chamber that it was in interfering contact with and move longitudinally relative to the ball nut, and remain in a fixed position relative to the screw shaft. That movement will continue until the shuttle comes into interfering contact with the other chamber end wall. The shuttle will then start to move in an axial direction and rotate relative to the screw shaft if that relative rotation continues.

In an embodiment of any of the above embodiments where the second channel end of the alpha lubricant channel is, in the axial direction, between the second channel end of the beta lubricant channel and the beta load circuit, and the second channel end of the beta lubricant channel is, in the axial direction, between the alpha load circuit and the second channel end of the beta lubricant channel, the shuttle and lubricant chamber are so configured that the shuttle is at all times axially between the second channel end of the alpha lubricant channel and the second channel end of the beta lubricant channel, and the shuttle moves between a position where the shuttle is adjacent the second channel end of the alpha lubricant channel and a position where the shuttle is adjacent the second channel end of the beta lubricant channel. Such an arrangement has an advantage in that the lubricant is caused by the shuttle to be forced to follow a circuit or flow path that passes through at least part of the both the alpha and beta load circuits, and through both the alpha and beta lubricant channels.

In addition to the above advantage, an additional advantage is that when the shuttle and ball bearings are pushing the lubricant through at least part of one of the load circuits, the lubricant that is pushed through the lubricant channel associated with that load circuit is delivered into the sub-chamber of the lubricant chamber which is at that time increasing in volume. That sub-chamber is accordingly at least partially filled with lubricant. When the direction of travel of the shuttle relative to the ball nut is reversed, the lubricant that has built up in the sub-chamber that had been increasing in volume is, assuming the sub-chamber is not full of lubricant, initially deformed and then pushed into the other of the load circuits, and subsequently through the lubricant channel associated with that load circuit and back into the other sub-chamber of the lubricant chamber.

In embodiments of the above embodiment where there is one way flow control means, for example a check valve, in the alpha and beta lubricant channels that allows lubricant to flow from the first channel end of the lubricant channel to the second channel end, but not to flow in the other direction, that flow control means prevents the shuttle pushing lubricant into the second mouth of the lubricant channel from the sub-chamber of the lubricant chamber that is decreasing in volume.

In an embodiment of any of the above embodiments one or more of the second channel ends of the alpha and beta lubricant channels are so located, the shuttle is so configured, and/or the lubricant chamber so configured that there is always a flow path for lubricant from the second channel mouth of the alpha lubricant channel to at least one of the intersections between one of the chamber end walls of the lubricant chamber and the external thread, and there is always a flow path for lubricant from the second channel mouth of the beta lubricant channel to at least one of the intersections between the other of the chamber end walls of the lubricant chamber and the external thread. This has the effect of ensuring that the flow of the lubricant into the lubricant chamber from the lubricant channels is not prevented by the shuttle blocking or closing either of the second channel ends of the lubricant channels.

In an embodiment of any of the above embodiments the shuttle and/or lubricant chamber is so configured that a part of the shuttle comes into interfering contact with a stop or part of a chamber end wall the remainder of the shuttle is spaced from the end wall the shuttle had been moving towards.

In an embodiment of any of the above embodiments one or both of the chamber end walls are configured to direct lubricant towards the intersection of that end wall and the external thread.

In an embodiment of any of the above embodiments, there are a plurality of alpha load circuits and/or there are a plurality of beta load circuits associated with an external thread on the screw shaft.

In an embodiment of any of the above embodiments, there are a first non-zero number of alpha load circuits and a second non-zero number of beta load circuits associated with an external thread on the screw shaft, and the first and second non-zero numbers are equal.

In an embodiment of any of the above embodiments, there are a first non-zero number of alpha load circuits and a second non-zero number of beta load circuits associated with an external thread on the screw shaft, and the first and second non-zero numbers are not equal.

In an embodiment of any of the above embodiments, there are a plurality of lubricant chambers and there are a plurality of alpha load circuits and/or there are a plurality of beta load circuits associated with an external thread on the screw shaft.

In an embodiment of any of the above embodiments there are a plurality of external threads on the screw shaft, and a number of internal threads suitable for the number of external threads. In this embodiment the plurality of external threads are parallel to each other, and the features of any of the above described embodiments described above in connection with a single external thread may be present in connection with one or more of the plurality of external threads.

In an embodiment of any of the above embodiments the ball screw further comprises a lubricant, and the lubricant is an oil or a grease.

BRIEF DESCRIPTION OF THE FIGURES

The present disclosure will be further described and explained by way of example with reference to the accompanying drawings in which.

DETAILED DESCRIPTION

Figure 1:
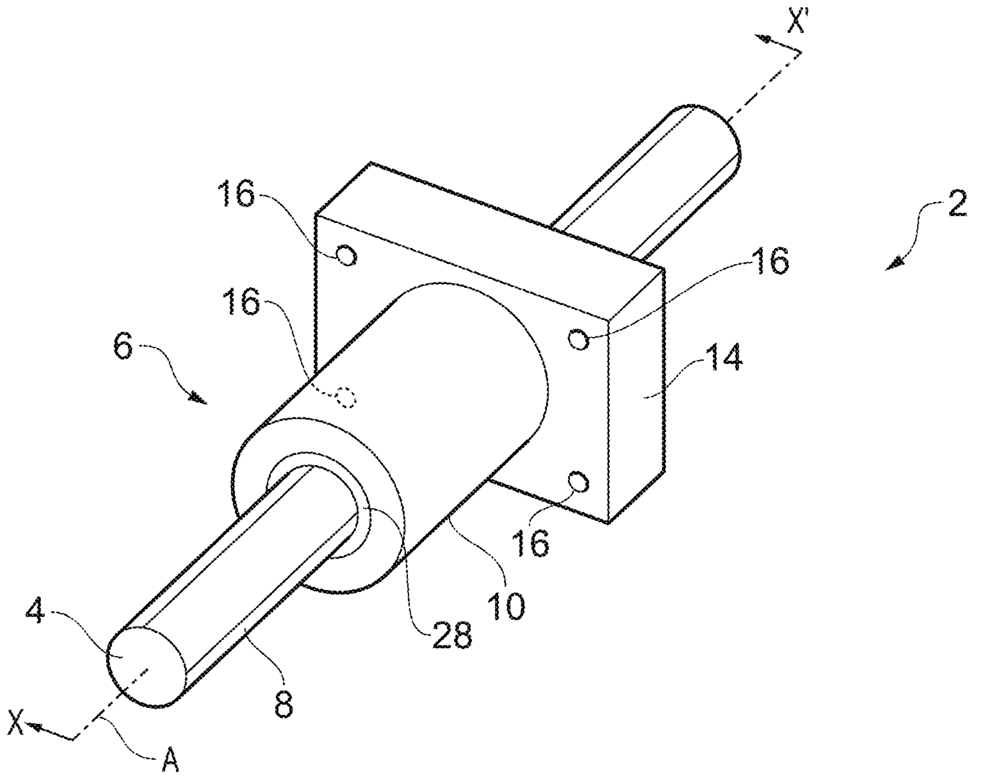
FIG. 1 shows a schematic perspective view of an embodiment of a ball screw according to the present disclosure.

With reference to FIG. 1 an external view of an embodiment of a ball screw 2 according to the present disclosure is shown. The ball screw 2 includes a screw shaft 4, a ball nut 6 an alpha load circuit 42 (shown in FIG. 5), and a beta load circuit 56 (shown in FIG. 5).

Figure 2:
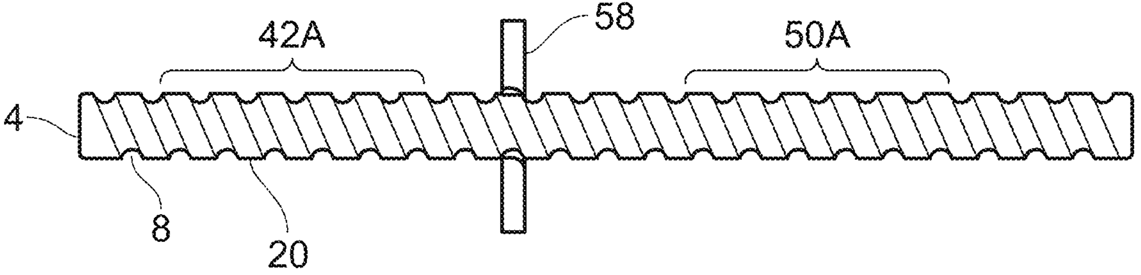
FIG. 2 shows detail of the screw shaft of FIG. 1.

With reference to FIGS. 1 and 2, the screw shaft 4 is a cylindrical shaft with a central axis A, and a longitudinally extending surface 20 which includes an external helical thread 8. The external thread 8 extends the whole length of the screw shaft 4. The external thread 8 forms the first part 42A of the alpha load circuit 42, and a first part 50A of the beta load circuit 50. The axial position of the first parts 42A, 50A of the alpha/beta load circuits 42, 50 will vary and depend on the axial position of the ball nut 6 on the screw shaft 4.

Figure 3:
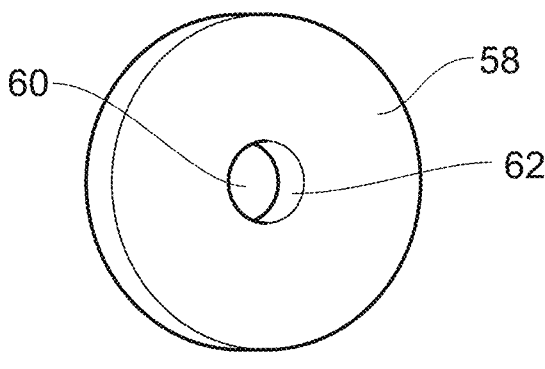
FIG. 3 shows detail of the shuttle of FIG. 2.

With reference to FIGS. 2 and 3, a shuttle 58 is engaged with the shaft 4. The shuttle 58 includes a bore 60. The surface 62 that defines the bore 60 has the form of an internal thread which is adapted to engage with the thread 8 of the screw shaft 4.

Figure 4:
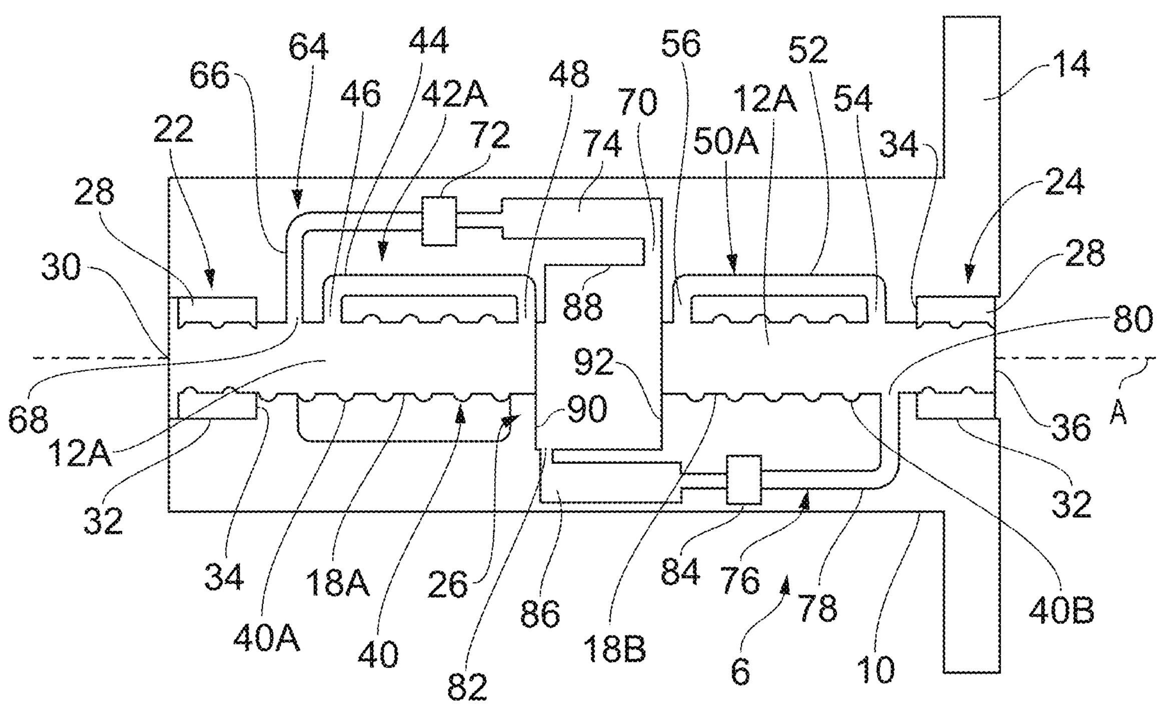
FIG. 4 shows a schematic sectional view of the ball nut of FIG. 1 along the section line X-X'.

With reference to FIGS. 1 and 4, the ball nut 6 includes a body 10, a substantially cylindrical bore 12, a flange 14, a second part 42B of the alpha load circuit 42, and a second part 50B of the beta load circuit 50. The flange 14 is adapted to be connected to other structures (not shown) using bolt holes 16.

The bore 12 is made up of a main bore 12A which is partially defined by axial surfaces 18A and 18B, a first ball nut seal receiving recess 22, a second ball nut seal receiving recess 24, and a lubricant chamber 26. The axial surfaces 18A, 18B are separated from each other by the lubricant chamber 26. Each of the axial surfaces 18A, 18B has the form of part 40A, 40B of an internal thread 40. The internal thread 40 would be continuous if not interrupted by lubricant chamber 26 and has the same pitch as external thread 8 on the screw shaft 4.

Each of the first and second ball nut seal receiving recesses 22, 24 are a cylindrical recess of greater diameter than the main bore 12A and are partially defined by surfaces 32 and 34 and first/second bore mouth 30, 36. The first and second ball nut seal receiving recesses 22, 24 are each adapted to receive a ball nut seal 28. The ball nut seals 28 are retained in the ball nut seal receiving recesses 22, 24 by a fixing means (not shown) such as a pin or a key. The ball nut seals 28 are held in an axially floating relationship to the body 10 by the fixing means. The ball nut seals 28 each have a central bore which is defined by an internal thread 38 which is adapted to engage with the thread 8 of the screw shaft 4.

In an alternative embodiment, the ball nut seals 28 are retained in the ball nut seal receiving recesses 22, 24 by a fixing means (not shown) such as an suitable adhesive with the result that the ball nut seals 28 are held in a fixed positional relationship to the body 10. The ball nut seals 28 each have a central bore which is defined by an internal thread 38 which is adapted to engage with the thread 8 of the screw shaft 4.

The second part 42A of the alpha load circuit 42 includes a ball return channel 44 which has first and second ends 46, 48. Both of the first and second ends 46, 48 open into the bore 12 through the axial wall of the body 10 that defines the bore 12. The ball return channel 44 and first and second ends 46, 48 are of dimensions suitable to allow a ball bearing to pass along the ball return channel 44 and through the first and second ends 46, 48. Scoops and/or deflectors (not shown) may be associated with the first and second ends 46, 48 so as to direct the movement of ball bearings into and out of each of the first and second ends 46, 48.

The second part 50A of the alpha load circuit 50 includes a ball return channel 52 which has first and second ends 54, 56. Both of the first and second ends 54, 56 open into the bore 12 through the axial wall of the body 10 that defines the bore 12. The ball return channel 52 and first and second ends 54, 56 are of dimensions suitable to allow a ball bearing to pass along the ball return channel 52 and through the first and second ends 54, 56. Scoops and/or deflectors (not shown) may be associated with the first and second ends 54, 56 so as to direct the movement of ball bearings into and out of each of the first and second ends 54, 56.

The body 10 of the ball nut 6 also includes an alpha lubricant channel 64 and a beta lubricant channel 76.

The alpha lubricant channel 64 has a first channel end 68 which opens into the main bore 12A through the axial surface of the bore 12. Associated with the first channel end 68 are one or more deflectors or scoops (not shown) which assist in directing lubricant into the alpha lubricant channel 64 when the ball screw is in some modes of operation. The first channel end 68 is the end of the alpha flow path 66. The alpha flow path 66 extends to the second channel end 70 which opens into the lubricant chamber 26.

The alpha flow path 66 includes a flow control means 72, for example a check valve, which allows flow of lubricant from the first channel end 68 to the second channel end 70, but prevents flow of lubricant in the opposite direction. The flow control means 72 may be located anywhere along the alpha flow path 66 and is not limited to the position shown in the Figures.

The alpha flow path 66 also includes a lubricant reservoir 74. The lubricant reservoir serves to increase the volume of the lubricant in the ball screw as a whole relative to known ball screws. The reservoir 74 may have lubricant introduced into the ball screw by a known means (not shown), for example a grease nipple.

The beta lubricant channel 76 has a first channel end 80 which opens into the main bore 12A through the axial surface of the bore 12. Associated with the first channel end 80 are one or more deflectors or scoops (not shown) which assist in directing lubricant into the beta lubricant channel 76 when the ball screw is in some modes of operation. The first channel end 80 is the end of the beta flow path 78. The beta flow path 78 extends to the second channel end 82 which opens into the lubricant chamber 26.

The beta flow path 78 includes a flow control means 84 which allows flow of lubricant from the first channel end 80 to the second channel end 82, but prevents flow of lubricant in the opposite direction. The flow control means 84 may be located anywhere along the beta flow path 78 and is not limited to the position shown in the Figures.

The beta flow path 78 also includes a lubricant reservoir 86. The lubricant reservoir serves to increase the volume of the lubricant in the ball screw as a whole relative to known ball screws. The reservoir 86 may have lubricant introduced into the ball screw by a known means (not shown), for example a grease nipple. In other non-illustrated embodiments, one of the alpha and beta flow paths 66, 78 does not include a reservoir 74, 86. In such embodiments the other of the reservoirs 74, 86 may be appropriately sized to act as the sole lubricant reservoir. As discussed below, the alpha and beta flow paths 66, 78 are in in lubricant communication with each other.

The lubricant chamber 26 is a ring torrid in shape and partially defined by a circumferential surface 88, a first chamber end wall 90, and a second chamber end wall 92. The second channel ends 70 and 82 of the alpha and beta flow paths 66, 78 open into the lubricant chamber 26 through the circumferential surface 88.

Figure 5:
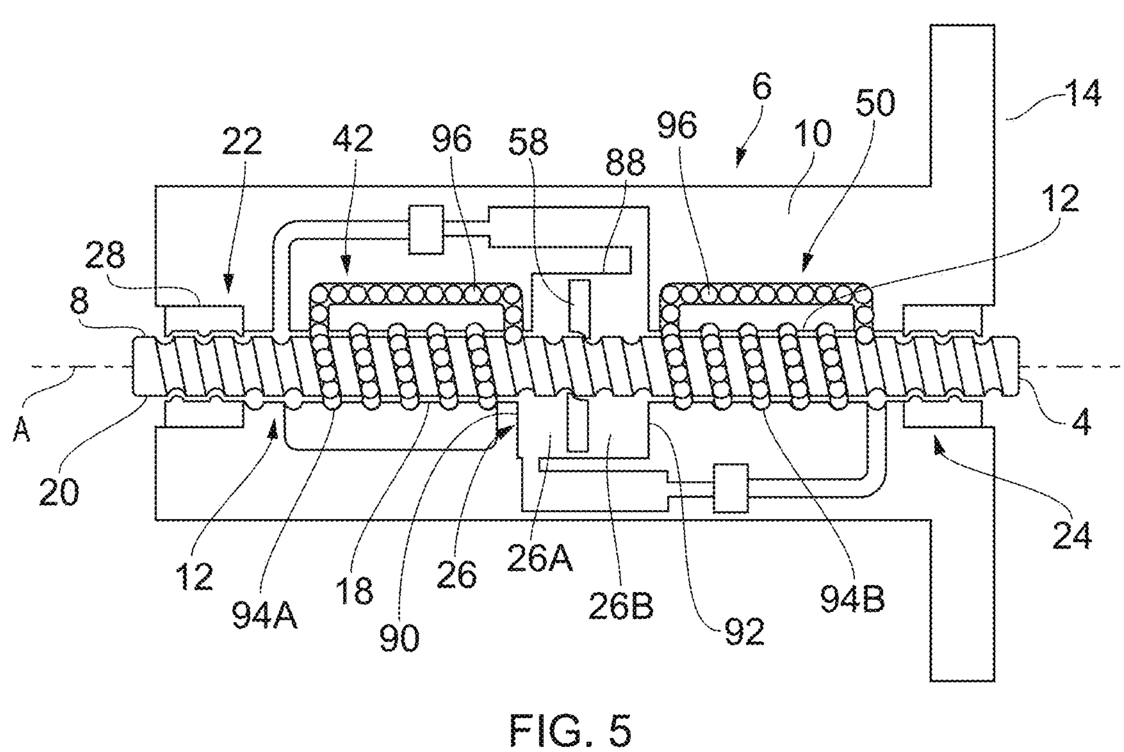
FIG. 5 shows a schematic sectional view of the ball screw of FIG. 1 along the section line X-X'.

With reference to FIG. 5 and further referencing FIGS. 1 to 4, the screw shaft 4 extends through the bore 12, and both are so dimensioned that the axial surface 20 of the screw shaft 4 is in a loose sliding fit with the axial surface 18 of the bore 12.

Once the screw shaft 4 is positioned in the bore 12 the external thread 8 and the internal threads 40A, 40B are registered with each other so that the external thread 8 and the internal threads 40A, 40B form closed channels 94A and 94B. This forms the alpha and beta load circuits 42, 50.

A plurality of ball bearings 96 are introduced into the alpha and beta load circuits 42, 50 via ball bearing introduction means (not shown). Once the ball bearings 96 have been introduced into alpha and beta load circuits 42, 50 the screw shaft 4 can only move axially relative to the ball nut 6 if one of the screw shaft 4 and ball nut 6 is rotated about central axis A relative to the other of the screw shaft 4 and ball nut 6. Lubricant 96 (shown in FIGS. 6 and 7 only) is then introduced into the alpha and beta load circuits 42, 50, lubricant chamber 26, alpha and beta flow paths 66, 78, and lubricant reservoirs 74, 86 via one or more introduction means (not shown).

The shuttle 58 is located in the lubricant chamber 26 and extends through the aperture or gap in the axial surface 18 of the bore 12. The shuttle 58 is so configured that the shuttle 58 extends to and is in sliding contact with the circumferential surface 88 and is axially between the first and second chamber ends 90, 92. The shuttle divides the lubricant chamber 26 into first and second sub-chambers 26A, 26B.

The shuttle 58 is so engaged with the screw shaft 4 that when the shuttle 58 is not in contact with the first or second chamber ends 90, 92, rotation around the central axis A of one of the screw shaft 4 and the ball nut 6 relative to the other causes the shuttle 58 to remain in a fixed position relative to the screw shaft 4 and to move relative to the ball nut 6. This movement of the shuttle 58 within the lubricant chamber 26 has the result that one of the first and second sub-chambers 26A, 26B increases in volume and the other decreases in volume. Any lubricant 96 in the sub-chamber which is decreasing in volume will, unless the sub-chamber is full of lubricant, initially be deformed so as to conform to the changing dimensions of the sub-chamber.

Once the sub-chamber which is decreasing in volume is full of lubricant 96, that lubricant will start to become pressurised and will be forced or pushed through the intersection of the external thread 8 and the chamber end wall 90 or 92 the shuttle 58 is moving towards. That lubricant 96 will move along the channel formed by the external thread 8 and the or each longitudinal surface 18A, 18B of the bore 12 and towards one or the other of the alpha and beta load circuits 42, 50 depending upon which direction the shuttle 58 is moving relative to the ball nut 6.

Figure 6:
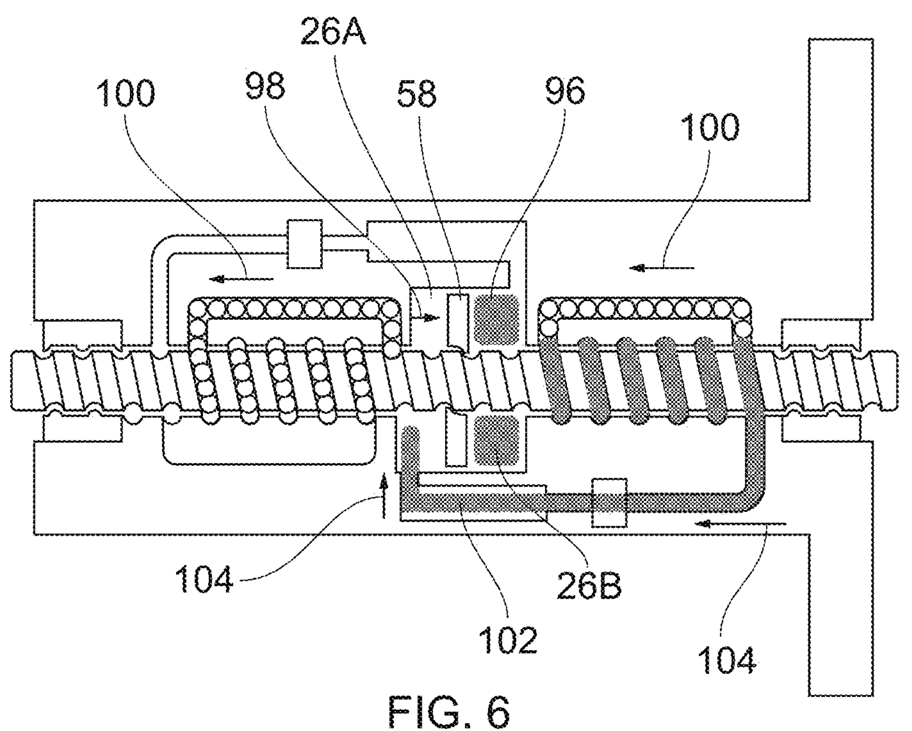
FIG. 6 shows a sectional view of a first lubricant flow in the ball screw of FIG. 1 along the section line X-X'.

With reference to FIG. 6 and further referencing FIGS. 1 to 5, when the screw shaft 4 is rotated about axis A in a first direction, the shuttle 58 will move in the direction shown by direction arrow 98 towards the second chamber end wall 92. The ball bearings 96 in the alpha and beta load circuits 42, 50 will move in the direction shown by direction arrow 100 along the ball return channels 44, 52 and along the closed channels 94A, 94B.

Lubricant 96 that is located in the sub-chamber 26A is pushed along the flow path indicated by the thick line 102 in the direction of direction arrows 104 until the lubricant 96 is deposited in sub-chamber 26A. Lubricant 96 is not pushed into alpha flow path 66 because the flow control means 72 prevents flow of lubricant from second channel end 70 towards first channel end 68.

Figure 7:
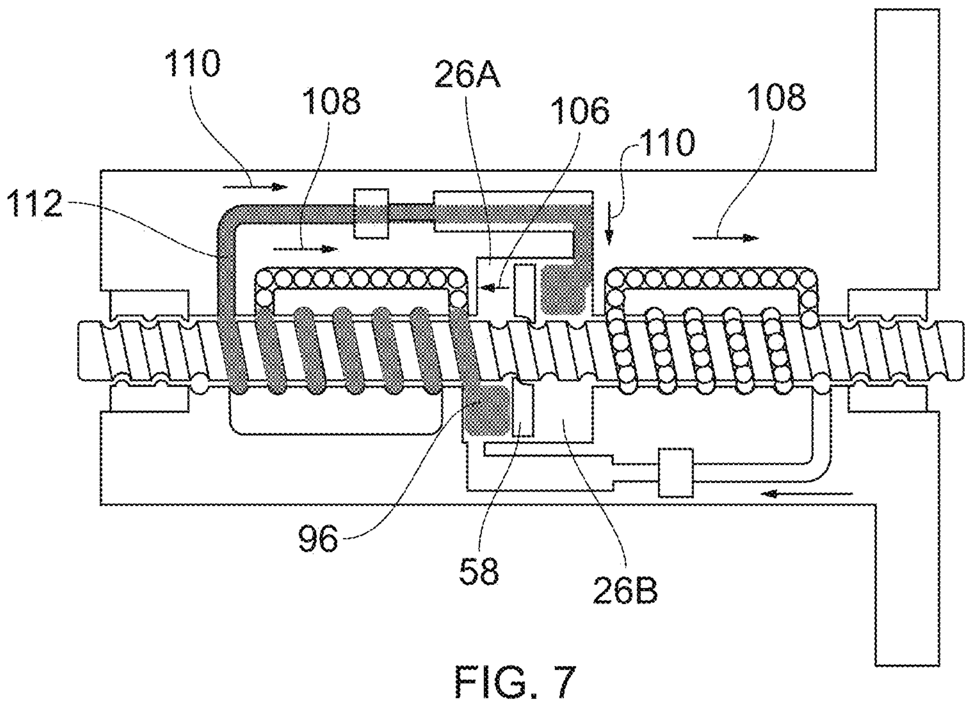
FIG. 7 shows a sectional view of a second lubricant flow in the ball screw of FIG. 1 along the section line X-X'.

With reference to FIG. 7 and further referencing FIGS. 1 to 5, when the screw shaft 4 is rotated about axis A in a second direction (which is opposite to the first direction), the shuttle 58 will move in the direction shown by direction arrow 106 towards the first chamber end wall 90. The ball bearings 96 in the alpha and beta load circuits 42, 50 will move in the direction shown by direction arrow 108 along the ball return channels 44, 52 and along the closed channels 94A, 94B.

Lubricant 96 that is located in the sub-chamber 26A is pushed along the flow path indicated by the thick line 112 in the direction of direction arrows 108 until the lubricant 96 is deposited in sub-chamber 26B. Lubricant 96 is not pushed into beta flow path 78 because the flow control means 84 prevents flow of lubricant from second channel end 82 towards first channel end 80.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the ball screw disclosed in the various embodiments may be used alone, in combination, or in a variety of arrangements not specifically discussed in the embodiments described above. This disclosure is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A ball screw comprising: a screw shaft, a ball nut, and alpha and beta load circuits in which the alpha and beta load circuits each comprise first and second parts, the screw shaft is longitudinally extending with a longitudinal central axis and at least part of a longitudinally extending surface of the screw shaft comprises an external thread, and at least one of the first parts of the alpha and beta load circuits comprise a part of the external thread, the ball nut comprises a body, a bore, the second parts of the alpha and beta load circuits, and an alpha and a beta lubricant channel, in which the bore is defined by the body, is longitudinally extending with a longitudinal central axis, has a first and second end, and has at least one longitudinally extending surface extending between the first and second ends, the first and second ends of the bore each comprise a mouth, and each mouth opens through an outside surface of the body, the longitudinally extending surface of the bore comprises at least one internal thread, and the second parts of the alpha and beta load circuits comprise at least a part of an internal thread, the screw shaft extends through the bore of the ball nut and the screw shaft and bore are so configured that they are co-axial, the external thread and each internal tread are so configured that the external thread and at least one of the internal threads together define at least one of a portion of the alpha load circuit and a portion of the beta load circuit, the alpha load circuit is spaced from the first end of the bore and extends an axial distance along the bore, the beta load circuit is spaced from the second end of the bore and extends an axial distance along the bore, the alpha and beta load circuits are spaced from each other, the alpha lubricant channel comprises a first and a second channel end and a flow path between the first and second channel ends, in which the first channel end is located between the first end of the bore and the second part of the alpha load circuit, and the second channel end is located between the second part of the alpha load circuit and the second part of the beta load circuit, the beta lubricant channel comprises a first and a second channel end and a flow path between the first and second channel ends in which the first channel end is located between the second end of the bore and the second part of the beta load circuit, and the second channel end is located between the second part of the alpha load circuit and the second part of the beta load circuit, rotation of one of the screw shaft and the ball nut relative to the other around the longitudinal axis causes axial movement of the ball nut relative to the screw shaft, the ball screw further comprises a shuttle, in which the shuttle is engaged with the longitudinally extending surface of the screw shaft, the shuttle is located between the first parts of the alpha and beta load circuits, and the shuttle is in sliding contact with the ball nut, and rotation of one of the screw shaft and the ball nut relative to the other around the longitudinal axis drives lubricant through one of the alpha and beta lubricant channels.

2. The ball screw according to claim 1, in which the ball screw further comprises:

a lubricant chamber, in which the lubricant chamber extends into the body of the ball nut from an aperture in at least one longitudinally extending surface of the bore, the lubricant chamber is partially defined by first and second chamber ends which are axially spaced from each other, the lubricant chamber is located between the second parts of the alpha and beta load circuits, the second channel ends of the alpha and beta lubricant channels open into the lubricant chamber, the external thread intersects both of the first and second chamber ends, and the shuttle extends into the lubricant chamber.

3. The ball screw according to claim 2, in which the lubricant chamber extends wholly around the bore in a circumferential direction.

4. The ball screw according to claim 3, in which the lubricant chamber has the form of a ring toroid.

5. The ball screw according to claim 1, in which at least one of the alpha and beta lubricant channels comprises a means to prevent flow of lubricant from the second channel end to the first channel end of that or those lubricant channels.

6. The ball screw according to claim 1, in which the second channel end of the alpha lubricant channel is, in the axial direction, between the second channel end of the beta lubricant channel and the beta load circuit, and the second channel end of the beta lubricant channel is, in the axial direction, between the alpha load circuit and the second channel end of the beta lubricant channel.

7. The ball screw according to claim 1, in which the ball nut further comprises a lubricant reservoir, and the reservoir and at least one of the alpha and beta lubricant channels are so configured that the flow path of lubricant from the first to the second channel end of the at least one lubricant channel includes flow of lubricant through at least part of the lubricant reservoir.

8. The ball screw according to claim 1, in which the ball screw further comprises at least one ball nut seal, each ball nut seal extends between the body of the ball nut and the screw shaft, and at least one of the ball nut seals is located at one of the mouth at the first end of the bore, between the first channel end of the alpha lubricant channel and the mouth at the first end of the bore, the mouth at the second end of the bore, or between the first channel end of the beta lubricant channel and the mouth at the second end of the bore.

9. The ball screw according to claim 1, in which the shuttle is engaged with the longitudinally extending surface of the screw shaft via an internal thread that engages with the external thread on the screw shaft.

10. The ball screw according to claim 2, in which the shuttle extends into the lubricant chamber through the aperture in the one or more longitudinal surfaces of the bore, the shuttle is in sliding contact with the one or more other surfaces, and the shuttle divides the lubricant chamber into first and second sub-chambers.

11. The ball screw according to claim 2, in which the shuttle is so engaged with the screw shaft that when the shuttle is not in contact with the first or second chamber ends of the lubricant chamber, rotation around the central axis of one of the screw shaft and the ball nut relative to the other causes the shuttle to remain in a fixed position relative to the screw shaft and to move relative to the ball nut.

12. The ball screw according to claim 11, in which the shuttle is so engaged with the screw shaft that rotation around the central axis of one of the screw shaft and the ball nut relative to the other causes the shuttle to remain in a fixed position relative to the ball nut and to move relative to the screw shaft when the shuttle is in interfering contact with either of the first or second chamber ends of the lubricant chamber.

13. The ball screw according to claim 10, in which one or more of the second channel ends of the alpha and beta lubricant channels are so located, the shuttle is so configured, or the lubricant chamber is so configured that there is always a flow path for lubricant from the second channel mouth of the alpha lubricant channel to at least one of the intersections between one of the chamber end walls of the lubricant chamber and the external thread, and there is always a flow path for lubricant from the second channel mouth of the beta lubricant channel to at least one of the intersections between the other of the chamber end walls of the lubricant chamber and the external thread.

14. The ball screw according to claim 1, in which there are a plurality of external threads, and a number of internal threads suitable for the number of external threads, and the same number of alpha and beta load circuits as there are internal threads.

15. The ball screw according to claim 1, in which in which the ball screw further comprises a lubricant, and the lubricant is an oil or a grease.

* * * * *